United States Patent
Brook et al.

[15] 3,694,475
[45] Sept. 26, 1972

[54] TITANIUM COMPOUNDS

[72] Inventors: David Whiteley Brook, Teesside; Raymond Ward, Coxhoe, both of England

[73] Assignee: British Titan Products Company Limited, Durham, England

[22] Filed: March 9, 1970

[21] Appl. No.: 17,938

[30] Foreign Application Priority Data

March 18, 1969 Great Britain..........14,049/69

[52] U.S. Cl.............260/429.5, 106/300, 106/308 Q, 260/404
[51] Int. Cl................................................C07f 7/28
[58] Field of Search........................260/429.5, 429 J

[56] References Cited

UNITED STATES PATENTS 2,824,114 2/1958 Bostwick................260/429.5
3,028,297 4/1962 Legally................260/429.5 X

FOREIGN PATENTS OR APPLICATIONS

42/26628 12/1967 Japan......................260/429.5

Primary Examiner—Tobias E. Levow
Assistant Examiner—H. M. S. Sneed
Attorney—Birch, Swindler, McKie & Beckett

[57] ABSTRACT

A titanium chelate useful as a gelling or stabilizing agent for aqueous suspensions which is the reaction product of monoethanolamine, a titanium orthoester and at least one other chelating agent. The other chelating agent is selected from alkanolamine other than monoethanolamine, a beta-diketone or alpha-hydroxy carboxylic acids.

15 Claims, No Drawings

TITANIUM COMPOUNDS

This invention relates to titanium compounds and particularly to titanium chelates which are suitable for use for forming gels in aqueous media or for use as dispersants or suspending agents for materials in aqueous media.

The formation of chelates from organic titanium orthoesters with a number of compounds is known. For instance, it is known to produce chelates from alkanolamines and titanium orthoesters and that such compounds produce a gel when mixed with aqueous media. However, it has been observed that a chelate prepared from monoethanolamine and a titanium orthoester is unstable when mixed with water in that it precipitates titanium dioxide and is too reactive for use to produce stable gels.

According to the present invention, a titanium chelate comprises the reaction product of monoethanolamine, a titanium orthoester and at least one other chelating agent being an alkanolamine other than monoethanolamine, a beta-diketone or an alpha-hydroxy carboxylic acid.

It has been found that the titanium chelates prepared from the monoethanolamine, titanium orthoester and the other chelating agent are substantially water stable over a wide range of composition and can be used to form gels in aqueous media or as dispersants or suspending agents economically.

Generally, the stability of the titanium chelate depends on the ratio of the number of moles of Ti to the total number of moles of chelating agent (i.e. monoethanolamine plus other chelating agent) contained in the chelate and the higher this ratio the stronger is the gelling effect of the chelate in aqueous media. Nevertheless, at a high ratio the stability of the chelate is somewhat impaired in the sense that it partially hydrolyses and precipitates some hydrous titanium dioxide. In addition, it has also been discovered that the gelling effect is also affected by the proportion of monoethanolamine to the other chelating agent and the greater the proportion of monoethanolamine the less the titanium chelate is stable to hydrolysis but the greater its effectiveness as a gelling agent.

When the other chelating agent is an alkanolamine other than monoethanolamine, it has been discovered that the form or degree of substitution of the nitrogen is important. For instance, if the nitrogen atom of the other chelating agent is in its tertiary form then the gelling effect of the chelate is reduced when compared with a chelate in which the nitrogen atom of the other chelating agent is in its secondary form.

Generally, the ratio of the number of moles of Ti to the total amount of moles of chelating agent is from 1:1 to 1:4 but this does depend on the exact form of the other chelating agent and on the amount of monoethanolamine.

When the chelating agent is in alkanolamine other than monoethanolamine then preferably the ratio of the number of moles of this other alkanolamine to the number of moles of monoethanolamine is from 50:1 to 1:10 and the ratio of the total number of moles of monoethanolamine plus the other alkanolamine to the number of moles of titanium contained in the titanium orthoester is from 1:1 to 4:1 The most preferred composition is that containing monoethanolamine, other alkanolamine and titanium orthoester in the molar ratio 0.75–1.5 : 0.5–1.5 : 1. Naturally, these proportions also vary according to the degree of substitution of the alkanolamine other than monoethanolamine.

When the other chelating agent is a beta-diketone then preferably the ratio of the number of moles of the beta-diketone to the number of moles of monoethanolamine is from 4:1 to 1:4 and the number of moles of monoethanolamine plus the beta-diketone to the number of moles of titanium contained in the titanium orthoester is from 1:1 to 4:1. The most preferred composition is that containing monoethanolamine, beta-diketone and titanium orthoester in the molar ratio 1:1:1. Proportions varying slightly from this preferred ratio also give extremely satisfactory products.

When the other chelating agent is an alpha-hydroxy carboxylic acid preferably the ratio of the number of moles of the acid to the number of moles of the monoethanolamine is from 5:1 to 1:5 and the number of moles of monoethanolamine plus the alpha-hydroxy carboxylic acid to the number of moles of titanium contained in the titanium orthoester is from 1:1 to 4:1. The most preferred composition is that containing monoethanolamine, alpha-hydroxy carboxylic acid and titanium orthoester in the molar ratio 2:1:1. Proportions varying slightly from this preferred ratio also give extremely satisfactory products.

The titanium orthoester which is employed to form the chelates according to the present invention is generally one having the formula $Ti(OR)_4$ in which the R group is an alkyl group containing from 2 to 10 carbon atoms, preferably two to four carbon atoms. In the general formula quoted $Ti(OR)_4$, the R groups can be the same or different. Typical examples of titanium orthoesters having this general formula are titanium tetraisopropoxide, titanium tetrabutoxide and titanium tetrahexoxide.

As stated, the other chelating agent which is used to form the compositions of the present invention together with monoethanolamine comprises an alkanolamine other than monoethanolamine, a beta-diketone or an alpha-hydroxy carboxylic acid. The alkanolamine other than the monoethanolamine is suitably one containing three or more carbon atoms and can be an alkanolamine such as isopropanolamine, triisopropanolamine, n-butanolamine and secondary butanolamine. The alkanolamine can contain more than one OH group and more than one $NH_2$ group. The beta-diketones are those which can react by alcoholysis in the enol form with the alkyl esters of the orthotitanic acid and an example of such a compound is acetyl acetone. The alpha-hydroxy carboxylic acid which can be employed can be a hydroxy monocarboxylic acid or a hydroxy dicarboxylic acid and can contain one or more hydroxy groups in its molecule provided at least one is in the alpha position. Typical examples of suitable acids are lactic acid and glycolic acid.

The chelates of the present invention can be prepared in a number of ways, for example by mixing the monoethanolamine and other chelating agent in the desired proportions followed by the addition of the titanium orthoester. If desired, either the monoethanolamine or the other chelating agent can firstly be reacted with the titanium orthoester followed by addition of the other ingredient.

The chelates of the present invention are particularly suitable for use in forming a gel in aqueous media. For instance, when mixed with water, a gel is formed which usually will be free of any precipitated hydrous titanium dioxide.

When the titanium to chelating agent ratio is low the time required for formation of the gel may be longer than where the Ti : chelate ratio is higher. Excellent control of the gelling time can be obtained by choice of the conditions. Low concentrations of active material tend to give the softer type of gel.

The chelates of the present invention can be used as dispersants to stabilize slurries containing a substantially high proportion of a dispersed solid. For instance, the pre-formed chelate may be added to an aqueous dispersion of titanium dioxide pigment to act as a dispersant and stabilizing agent for the titanium dioxide pigment to maintain it in its dispersed form throughout the aqueous medium at a substantially high concentration. In this case, a gel is not truly formed in the mixture unless the required proportion of the chelate is used. The proportion of the chelate employed to obtain a dispersed and stable suspension depends on a number of factors, for instance on the type of chelate, on the amount of material to be dispersed and on its type. But with suspensions of titanium dioxide pigments it has been discovered that only a small proportion of the preferred chelates, say from 0.2 percent to 2 percent by weight of the suspension is required. The suspension is in a form readily amenable to mixing with further ingredients such as those, for example, to be added to an aqueous titanium dioxide suspension or slurry for forming into an aqueous emulsion paint. Such a further ingredient would be, for example, a film-forming polymer to act as a binder for the paint.

The chelates can also be used to stabilize suspensions or dispersions in aqueous media of oils, fats and waxes, typical examples being the waxes used in polishes.

The chelates according to the present invention can contain either one or more of the other chelating agent referred to previously. For instance, the chelate can comprise a reaction product of monoethanolamine, an alkanolamine other than monoethanolamine, a beta-diketone and the titanium orthoester. If desired, the chelating agent can be formed from a monoethanolamine, other chelating agent, titanium orthoester and either ethylene glycol, propylene glycol or diethylene glycol.

The gels formed can be either strong and rigid and only broken down by the application of a relatively strong shearing force, or weak and reversible. The type depends on the type and concentration of the chelating agent used. The soft gels are usually reversible, that is, when the gel is broken down a liquid is formed which has roughly the same viscosity as the original system. On standing the gel will reform.

The invention is described in the following Examples:

EXAMPLE 1

In a round bottomed flask fitted with a stirrer, thermometer and water cooled condenser was placed a mixture of 76 grams monoethanolamine and 110 grams of triethanolamine. To the mixture there was added slowly 284 grams of tetraisopropyl titanate. The apparatus containing the titanium ester was fitted with a drying tube to prevent ingress of atmospheric moisture. Heat was evolved during the reaction and the product was a titanium chelate comprising a pale yellow liquid.

Twenty grams of the titanium chelate obtained were mixed with 80 grams of water to give a clear colorless solution. The solution set within 24 hours at room temperature to a rigid transparent gel.

A highly concentrated slurry was prepared by dispersing 650 grams of anatase titanium dioxide pigment in 350 grams of water containing 2.5 grams of a dispersing agent available under the name of calgon. To a 250 gram portion of the slurry so prepared was added 5 grams by weight of the titanium chelate obtained as a yellow liquid. After allowing the mixture to stand for 24 hours at room temperature it was found that the slurry had set to a soft reversible gel which could readily be broken down into a free-flowing liquid and no sedimentation had occurred whatsoever. After storing for 3 weeks, the suspension showed no sedimentation. A similar 250 gram portion stored for 24 hours but without being mixed with the titanium chelate had settled to form a hard layer on the base of the container which proved to be impossible to redisperse.

A concentrated slurry was prepared by dispersing 680 grams of a rutile titanium dioxide pigment in 320 grams of water to which there had been added 3.5 grams of "Calgon" as the dispersing agent. To a 300 gram portion of the slurry so prepared was added 0.6 grams of the titanium chelate obtained as a yellow liquid and after allowing the slurry to stand for 48 hours at room temperature it was observed that no sedimentation of the pigment had occurred although the slurry had not formed a gel. A similar sample of the untreated slurry was found to have settled out considerably after standing for 24 hours at room temperature.

To a further 300 gram portion of the slurry of rutile titanium dioxide was added 1.5 grams of the titanium chelate obtained as a yellow liquid. After standing for 48 hours the slurry was found to have set to a soft reversible gel which could readily be broken down to a free-flowing liquid. It was observed that no sedimentation had taken place whatsoever even after storing for 50 days.

EXAMPLE 2

A titanium chelate was prepared according to the method described in Example 1 but from 284 grams of tetraisopropyl titanate, 61 grams of monoethanolamine and 105 grams of diethanolamine. The product was a pale yellow liquid.

Sufficient of the titanium chelate obtained was added to water to produce a 15 percent by weight aqueous solution and it was seen that after standing for 12 hours at room temperature the solution had set into a rigid transparent gel.

EXAMPLE 3

A titanium chelate was prepared according to the method described in Example 1 but from 284 grams of tetraisopropyl titanate, 61 grams of monoethanolamine and 100 grams of acetylacetone. The titanium chelate obtained was a bright yellow liquid and when 20 grams of the chelate were mixed with 80 grams of water it was found that a pale yellow solution was obtained. This solution set to a transparent yellow gel after standing for 15 minutes at room temperature.

EXAMPLE 4

A titanium chelate was prepared according to the method described in Example 1 from 280 grams of tetraisopropyl titanate, 122 grams of monoethanolamine and 90 grams of lactic acid. The product was a water white liquid which when dissolved in water to give a 20 percent solution formed a gel within 2 hours of standing at room temperature.

EXAMPLE 5

A number of titanium chelates were prepared by the general method of Example 1 from tetraisopropyl titanate (TIPT), tetra-normal-butyl titanate (TNBT), monoethanolamine (MEA), diethanolamine (DEA), triethanolamine (TEA), monoisopropanolamine (MIPA), diisopropanolamine (DIPA), triisopropanolamine (TIPA), and 2-amino 2-methyl-propane 1-3 diol (AMPD).

The reactants and their proportions and gelling time of a 20 percent aqueous solution of each titanium chelate formed are shown in the following Table.

TABLE

| Titanate Name (Moles) | MEA (Moles) | Alkanolamine Name (Moles) | Gelling time for 20% soln. in water |
|---|---|---|---|
| TIPT | MEA | MIPA | |
| 1 | 1 | 1 | Almost immediate |
| | | DIPA | |
| 1 | 2 | 1 | 10 mins. |
| 1 | 1 | 1 | 10 mins. |
| 2 | 1 | 3 | 15 mins. |
| | | TIPA | |
| 1 | 1 | 1 | 120 mins. |
| | | DEA | |
| 1 | 3 | 1 | <24 hours |
| 1 | 2 | 2 | <24 hours |
| | | TEA | |
| 4 | 3 | 5 | <24 hours |
| 2 | 5 | 1 | <24 hours |
| 2 | 3 | 1 | 6 mins. |
| | | AMPD | |
| 1 | 1 | 1 | 2 mins. |
| 1 | 2 | 1 | 5 mins. |
| TNBT | | DEA | |
| 2 | 1 | 3 | 12 mins. |
| | | TEA | |
| 4 | 5 | 3 | 24 hours |
| | | DEA | |
| 1 | 1 | 1 | 1 min. |

We claim:

1. A titanium chelate comprising the reaction product of monoethanolamine, a titanium orthoester having the formula Ti(OR)$_4$ in which the R group is an alkyl group containing two to 10 carbon atoms, and at least one other chelating agent selected from the class consisting of alkanolamines containing at least three carbon atoms, beta-diketones reactable on alcoholysis in the enol form with the alkyl esters of orthotitanic acid, and hydroxy substituted carboxylic acids containing at least one hydroxy group in the alpha position.

2. A titanium chelate according to claim 1 in which the ratio of the number of moles of Ti to the total number of moles of the monoethanolamine and the other chelating agent is from 1:1 to 1:4.

3. A titanium chelate according to claim 2 in which the other chelating agent is an alkanolamine other than monoethanolamine and the ration of the number of moles of the other alkanolamine to the number of moles of monoethanolamine is from 50:1 to 1:10.

4. A titanium chelate according to claim 3 in which the molar ratio of monoethanolamine to other alkanolamine to the titanium orthoester is from 0.75–1.5 : 0.5–1.5 : 1.

5. A titanium chelate according to claim 2 in which the other chelating agent is a beta-diketone and the ratio of the number of moles of the beta-diketone to the number of moles of monoethanolamine is from 4:1 to 1:4.

6. A titanium chelate according to claim 5 in which the molar ratio of monoethanolamine to beta-diketone to titanium orthoester is from 1:1:1

7. A titanium chelate according to claim 2 in which the other chelating agent is an alpha-hydroxy carboxylic acid and the ratio of the number of moles of the carboxylic acid to the number of moles of the monoethanolamine is from 5:1 to 1:5.

8. A titanium chelate according to claim 7 in which the molar ratio of the monoethanolamine to alpha-hydroxy carboxylic acid to titanium orthoester is 2:1:1.

9. A titanium chelate according to claim 1 in which the R group contains from two to four carbon atoms.

10. A titanium chelate according to claim 1 in which the alkanolamine other than monoethanolamine contains three or more carbon atoms.

11. A titanium chelate according to claim 7 in which the alpha-hydroxy acid is a hydroxy monocarboxylic acid.

12. A titanium chelate according to claim 1 in which the alpha-hydroxy carboxylic acid is a hydroxy dicarboxylic acid.

13. A method of preparing a titanium chelate according to claim 1 in which the monoethanolamine and other chelating agent are mixed in the desired proportions to which is then added a titanium orthoester.

14. A method of preparing a titanium chelate according to claim 1 in which either the monoethanolamine or the other chelating agent are reacted with the titanium orthoester to which is then added the remaining ingredient.

15. A titanium chelate according to claim 8 in which the alpha-hydroxy acid is a hydroxy monocarboxylic acid.

* * * * *